United States Patent [19]
Yevick

[11] 4,154,506
[45] May 15, 1979

[54] PROJECTION LENS PLATE FOR MICROFICHE

[75] Inventor: George J. Yevick, Leonia, N.J.

[73] Assignee: Izon Corporation, Stamford, Conn.

[21] Appl. No.: 713,960

[22] Filed: Aug. 12, 1976

[51] Int. Cl.² ............................................. G02B 1/04
[52] U.S. Cl. .................................. 350/167; 350/178; 350/253; 353/39
[58] Field of Search ..................... 350/167, 253, 178; 353/39, 38

[56] References Cited

U.S. PATENT DOCUMENTS

| | | | |
|---|---|---|---|
| 1,466,973 | 9/1923 | Takanashi | 350/167 X |
| 3,263,088 | 7/1966 | Goldfischer | 350/167 X |
| 3,532,038 | 10/1970 | Rottmann | 350/167 UX |
| 3,586,816 | 6/1971 | Hagen | 350/167 X |
| 3,706,486 | 12/1972 | de Montebello | 350/167 |

FOREIGN PATENT DOCUMENTS 461138 11/1949 Canada .................................. 350/253

Primary Examiner—John K. Corbin
Assistant Examiner—John D. Lee
Attorney, Agent, or Firm—Thomas J. Greer, Jr.; Daniel M. Rosen

[57] ABSTRACT

A projection lens plate for a microfiche and method of its manufacture. A base or substrate having greater dimensional stability against creepage, humidity, and thermal cycling than the optic material carries a plurality of openings for receiving extruded optic material, the optic material forming lenses after hardening. Extrusion passages in a die head carry the optic material to the substrate openings. The die head is provided with accurately spaced lens-forming cavities onto which the optic material flows to thereby form lenses. By this process and apparatus the lenses are very accurately located relative to each other, while the openings in the substrate need not be accurately located relative to each other. The substrate openings are larger than the diameter of the lenses. Further, by fashioning the substrate of a dimensionally stabler material than the lens material, accurate registry of the lenses vis a vis each other is maintained.

3 Claims, 8 Drawing Figures

FIG. 1
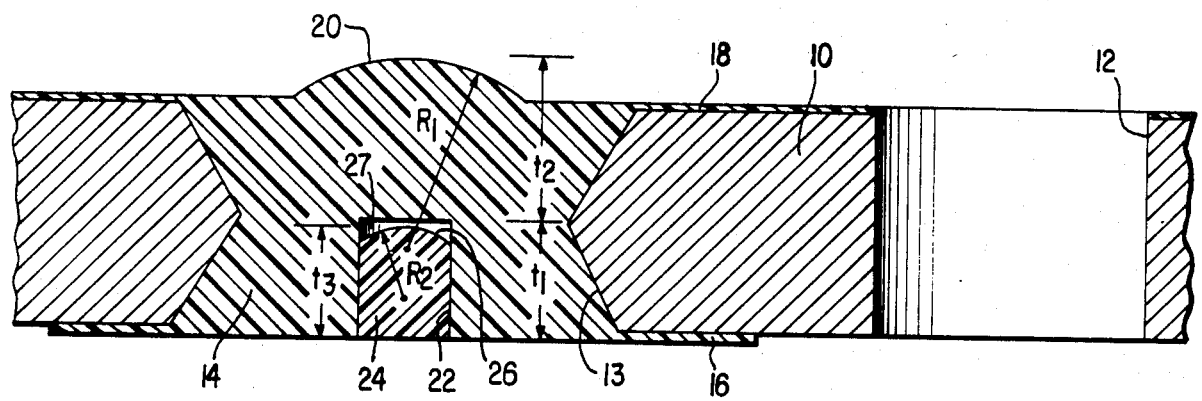
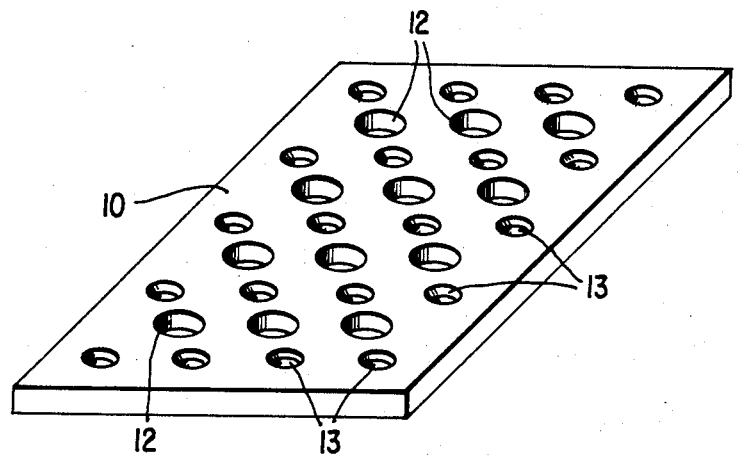
FIG. 2

PROJECTION LENS PLATE FOR MICROFICHE

This invention relates to microfiche readers and recorders and more particularly to a lens plate for projecting and magnifying light as well as for recording.

In the mass production of lens plates for microfiche recording and viewing using such optical schemes, a serious problem arises in accurately molding the projection lenses to high tolerance for the hundreds of such projection lenses required for a single lens plate and at the same time maintaining proper optical registry.

According to the practice of this invention, the manufacture of projection lens plates carrying Petzval lenses, Cassegrainian lenses as well as other lenses is facilitated. A die head having extrusion passages for optic material and lens-forming cavities on its forward face is placed adjacent a lens plate base or substrate having openings. The extrusion fills the openings and forms curved surfaces, i.e., lenses, at the die head recesses. The diameter of the lens-forming die head cavities is significantly less than the diameter of the substrate openings. Thus, the substrate openings may be located relative to each other under wide tolerances, with consequent economies of manufacture. Further according to the practice of this invention, the substrate which supports and carries the projection lenses is formed of a material different from the lens material. In this manner, the advantages of a metal substrate may be enjoyed with the advantages of plastic for forming the projection lenses.

IN THE DRAWINGS

FIG. 1 is a cross-sectional view of a typical lens plate formed in accordance with the practice of this invention.

FIG. 2 is a perspective view of a typical substrate for a finished lens plate.

Figure 3:
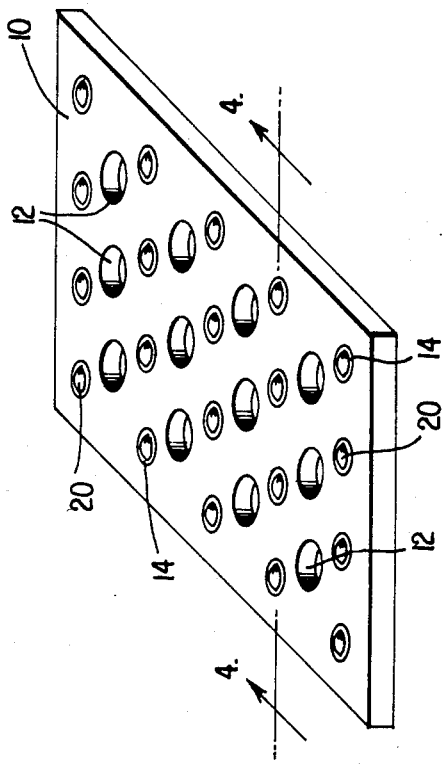
FIG. 3 is a view similar to FIG. 2 with the projection lenses placed in the lens plate in accordance with the practice of this invention.

Referring now to FIG. 1 of the drawings, the numeral 10 denotes generally a projection lens plate or substrate similar to projection lens plate 14 of FIG. 1 of my patent U.S. Pat. No. 3,864,034. The numeral 12 denotes any one of a plurality of locating apertures in the lens plate. The numeral 14 denotes a projection lens of a transparent material such as polymethylmethacrylate, the lens having a main body portion and a curved surface, and being received in opening 13. The body portion of each lens includes a flat lower portion 16 which extends beyond the periphery of the opening in plate 10 which receives the lens. The numeral 18 denotes a corresponding portion of the top surface of plate 10. The numeral 20 denotes a curved surface of radius of curvature $R_1$. The numeral 22 denotes an aperture centrally located in the bottom of the lens and carries an insert element, denoted by the numeral 24 and having a curved surface 26 of radius $R_2$. The dimension $t_1$ indicates the height of opening 22, the dimension $t_2$ indicates the distance from the top of opening 22 to the topmost portion of curved lens surface 20. The dimension $t_3$ indicates the height of insert 24. It will be understood that insert 24 is also of a transparent material such as polymethylmethacrylate and that a space 27 is defined between the lens surface 26 and the top of opening 22. The insert element 24 with its curved surface 26 defines a second lens. The lens 14 and the insert 24 defines a compound lens.

Referring now to FIG. 2 and FIG. 3 of the drawings, the numeral 10 again indicates a lens base or substrate, having greater dimensional stability against creepage, humidity and thermal cycling than the lens material, shown in generally rectangular configuration, while the numeral 12 again denotes any one of a plurality of apertures spaced over substrate 10. The numeral 13 denotes a second plurality of openings. To assist the reader in distinguishing these two sets of apertures or openings, locating apertures 12 are shown as of larger diameter than lens receiving openings 13. Each lens receiving opening 13 is of non-uniform diameter along its depth, as shown at FIG. 1, for example. As shown in FIG. 3, the completed lens plate includes curved surfaces 20 which are integral with bodies 14, the latter having been placed in openings 13 by means of the process now to be described.

Figure 4:
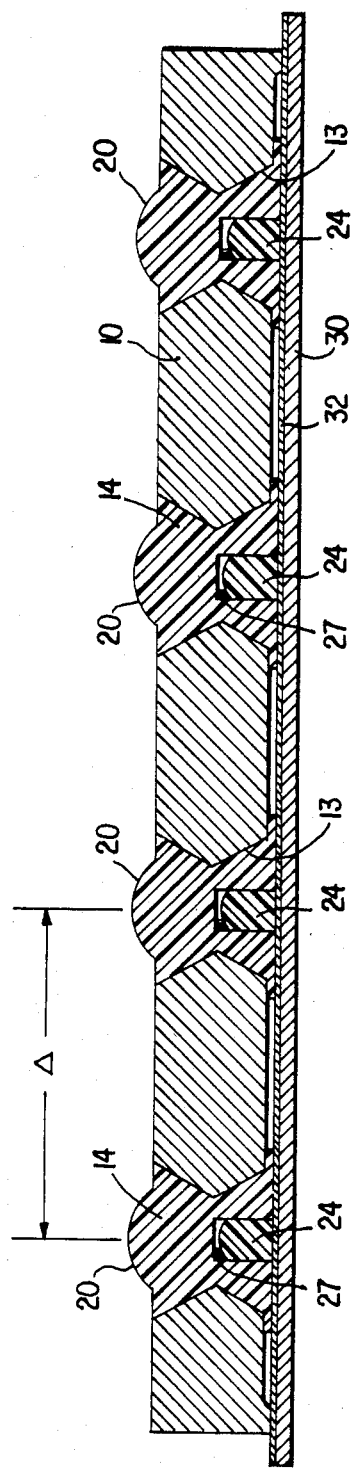
FIG. 4 is a view similar to FIG. 1 and illustrates a projection lens plate in combination with a microfiche wherein the microfiche is defined by supporting base carrying a photographic emulsion.
Figure 5:
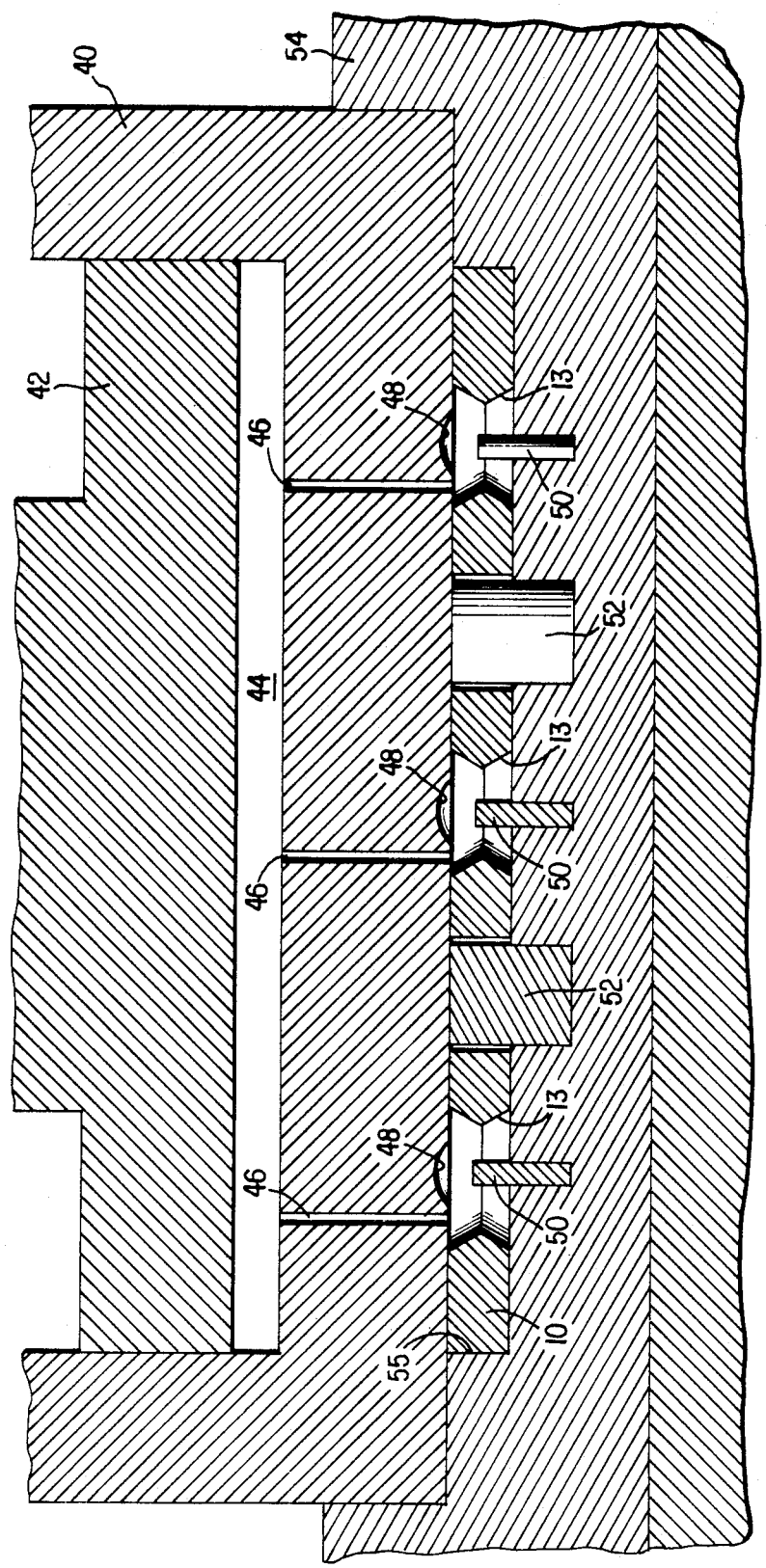
FIG. 5 is a typical cross-sectional view illustrating the plate of FIG. 2 in a mold fashioned according to the practice of this invention.

FIG. 4 is a view taken along section 4—4 of FIG. 3, with the additional showing of a microfiche defined by supporting base or substrate 30 and photographic emulsion 32. The finished lens plate of FIG. 3 is fashioned from the base shown at FIG. 2 in the following manner. Referring now to FIG. 5 of the drawings, the numeral 40 denotes a die head which carries therein a movable piston 42 positioned in a cylinder. Space or chamber 44 is defined between the bottom of the piston and the lower face or end of the die head. This chamber is adapted to contain a transparent and extrudable, flowable optic material, such as polymethylmethacrylate. The numeral 46 denotes any one of a plurality of passages through which the flowable optic material is adapted to pass upon the application of force from piston 42. The numeral 48 denotes any one of a plurality of lens forming recesses or cavities in the front face of die head 40. It will be noted that these recesses are adjacent the exit ends of passages 46. The numeral 50 denotes any one of a plurality of removable core elements which extend up to openings 13 of substrate 10. The numeral 52 denotes any one of a plurality of removable, substrate locating pins which extend up into and are received by openings 12 in the substrate 10. The numeral 54 denotes a lower die plate having a recess 55 which receives the substrate.

With the elements positioned as shown at FIG. 5 the reader will now understand the mode of fabrication. The piston 42 is depressed, thereby forcing the transparent optic material in chamber 44 down and through passages 46 and into openings 13. The optic material fills the openings 13 and forms the lens surfaces 20 by flowing up and against cavities 48, and forms the top portions 18 and bottom portions 16 (see FIG. 1) of each lens body 14. Air bleed passages, not illustrated, are provided in die plate 54. The depth of recess 55 is greater than the thickness of the substrate 10. The die head 40 and the die plate 54 are now removed after the termination of hydraulic force in chamber 44, the plate 19 then is removed and the structure shown at FIG. 3 is complete. The utility of the apparatus and method will now be apparent. Namely, the recesses 48 are accurately located and formed on rectangular die head 40. The locating openings 12 and the lens receiving openings 13 (see FIG. 2) of substrate 10 need not, however, be located relative to each other with great accuracy. In fact, their spacing relative to each other is not at all critical, so long as the diameter of lens surface recesses 48 is significantly smaller than the diameter of openings 13. In the event that a Petzval lens such as shown in FIG. 1 is employed, it is necessary that the removable cores 50 be accurately aligned with respect to recesses 48 in die head 40. Thus, large manufacturing tolerances in forming the apertures 12 and 13 of FIG. 2 are permitted, yet the end result of accurately positioned lenses is nevertheless enjoyed. With further regard to FIG. 5, the reader will readily understand that the removable core elements 50 and positioning pins 52 may be integral with die plate 54. Pins 52 preclude downward bowing of die head 40 and upward bowing of die plate 54, thereby maintaining ($t_1 + t_2$) accurately at all areas of the lens plate.

Figure 6:
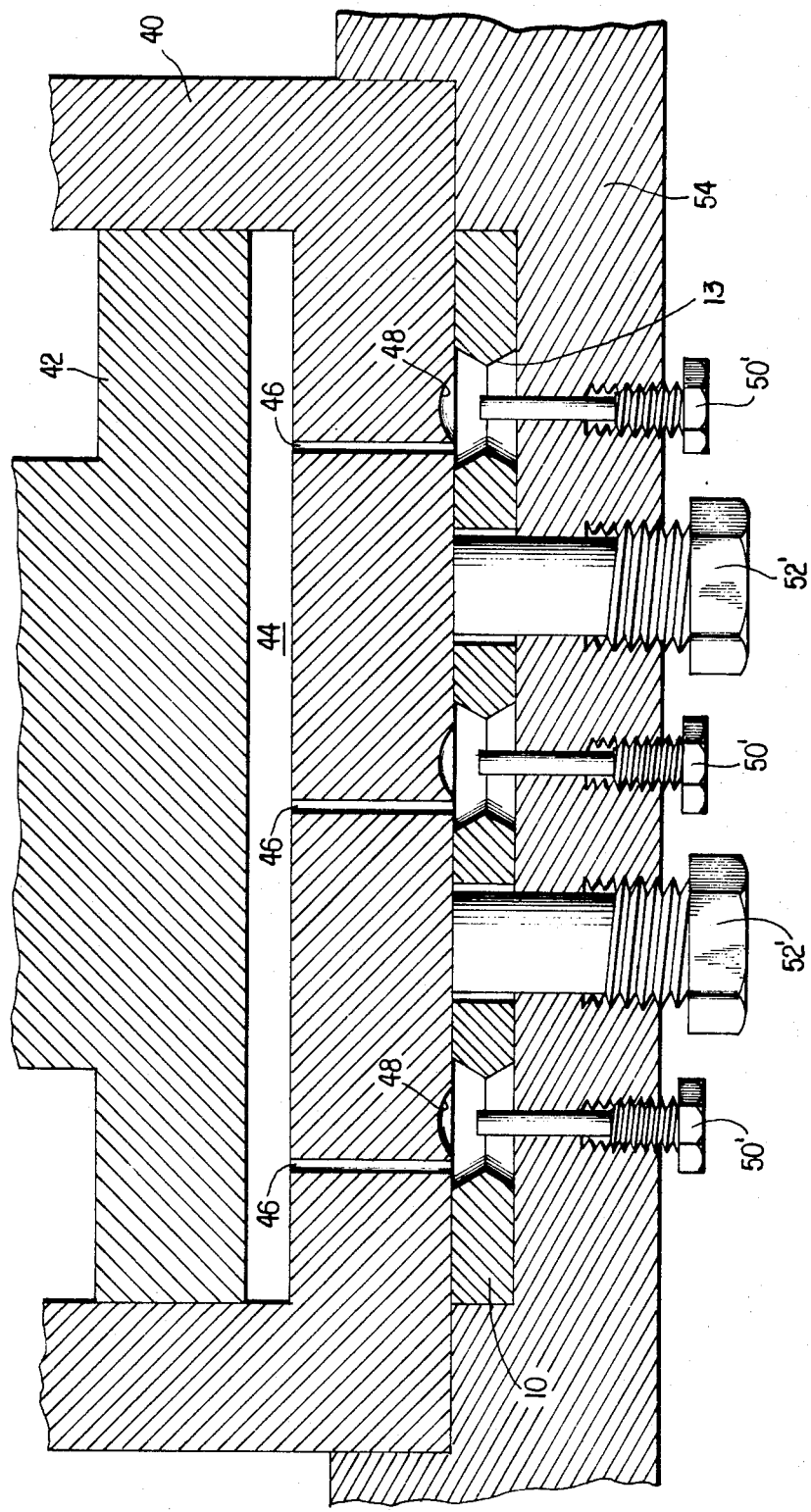
FIG. 6 is a view similar to FIG. 5 and illustrates an embodiment of the mold.

Referring now to FIG. 6, an embodiment of the lower die plate 54 is shown wherein the core members 50 are now denoted by the numeral 50' and the positioning pin elements 52 are denoted by numeral 52'. The indicated screw threads on these members permit adjusting to thereby obtain different thicknesses of both lens bodies 14 and lens body openings 22.

Figure 7:
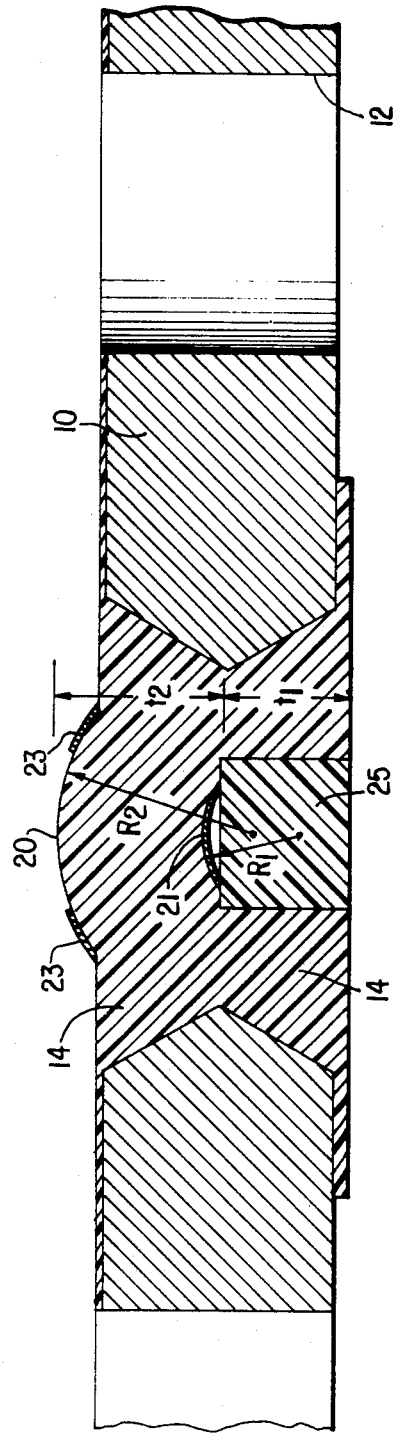
FIG. 7 is a view similar to FIG. 1 and illustrates an embodiment wherein a Cassegrainian lens is formed in the lens plate.

Referring now to FIG. 7 of the drawings, a modification of a lens member shown in FIG. 1 is given.

In FIG. 7, a Cassegrainian lens is shown with lower or second Cassegrainian reflector 21 mirrored on its upper surface and upper or first Cassegrainian reflector 23 mirrored on its lower surface. Reflector 21 may be carried by insert block 25.

Figure 8:
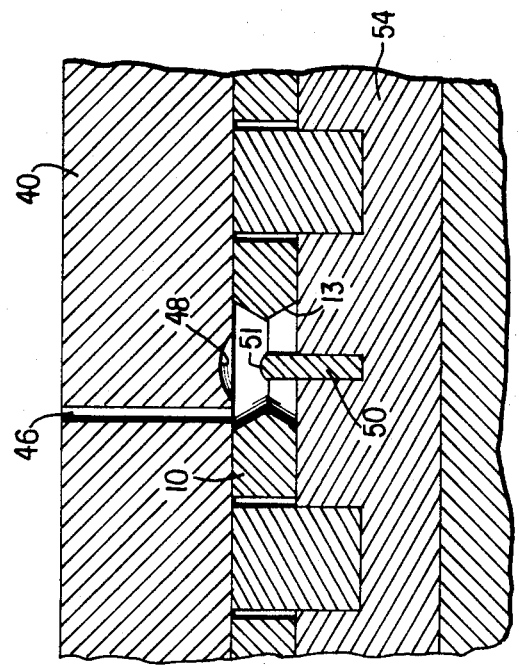
FIG. 8 is a partial view of a modification of the mold shown in FIG. 5, the modification facilitating the manufacture of Cassegrainian lens shown at FIG. 7.

FIG. 8 of the drawings illustrates how modification of the apparatus shown at FIG. 5 will yield a lower reflecting surface 21 of FIG. 7. Namely, it is only necessary that the top end portion of core elements 50 be curved, as indicated by numeral 51, to define the lower reflecting surface 21 of each Cassegrainian lens.

In each of the embodiments, the reader will note that it is necessary that the recesses 48 on the die head be superposed within the confines or area of the substrate openings 13. Thus, the center of a recess 48 need not be coincident with the center of its corresponding substrate opening, so long as the above superposition limitation is met. It has been found that aluminum is a desirable material from which to fashion the substrate.

What is claimed is:

1. A generally planar lens plate having an apertured substrate, the apertures being filled with a lens forming plastic material to thereby define lenses in the apertures, the coefficient of thermal and of humidity expansion of the substrate being less than those of the lens material, each lens of the lens plate being a compound lens, one of the lenses of each compound lens having an aperture which receives another, second lens within a portion of the said one, first mentioned lens.

2. A generally planar lens plate having an apertured substrate, the apertures being filled with a lens forming plastic material to thereby define lenses in the apertures, the creepage of the substrate being less than that of the lens material, each lens of the lens plate being a compound lens, one of the lenses of each compound lens having an aperture which receives another, second lens within a portion of the said one, first mentioned lens.

3. A generally planar lens plate having an apertured substrate, the apertures being filled with a lens forming plastic material to thereby define lenses in the apertures, the coefficient of thermal and of humidity expansion of the substrate being less than those of the lens material, each lens of the lens plate being a compound lens, one of the lenses of each compound lens having an aperture which received another, second lens within a portion of the said one, first mentioned lense, each aperture being of a nonuniform diameter along its depth.

* * * * *